(12) United States Patent
Patil

(10) Patent No.: US 12,528,413 B2
(45) Date of Patent: Jan. 20, 2026

(54) LIFTING STEP ASSEMBLY FOR AN INDUSTRIAL VEHICLE

(71) Applicant: Volvo Truck Corporation, Gothenburg (SE)

(72) Inventor: Uday Patil, Gadhinglaj Kolhapur Maharashtra (IN)

(73) Assignee: Volvo Truck Corporation, Gothenburg (SE)

( * ) Notice: Subject to any disclaimer, the term of this patent is extended or adjusted under 35 U.S.C. 154(b) by 403 days.

(21) Appl. No.: 18/119,370

(22) Filed: Mar. 9, 2023

(65) Prior Publication Data

US 2023/0322160 A1    Oct. 12, 2023

(30) Foreign Application Priority Data

Apr. 8, 2022  (EP) .................................... 22167437

(51) Int. Cl.
  *B60R 3/02*    (2006.01)
(52) U.S. Cl.
  CPC ..................................... *B60R 3/02* (2013.01)
(58) Field of Classification Search
  CPC ...................................................... B60R 3/02
  See application file for complete search history.

(56) References Cited

U.S. PATENT DOCUMENTS 5,375,962 A * 12/1994 Kempf ...................... B60R 3/02
   414/539
8,042,820 B1 * 10/2011 Dewees .................... B60R 3/02
   280/166

FOREIGN PATENT DOCUMENTS

| CN | 215850991 U | 2/2022 |
| JP | H0671306 U | 10/1994 |
| JP | H10287184 A | 10/1998 |
| JP | 2006312392 A | 11/2006 |

OTHER PUBLICATIONS

Extended European Search Report for European Patent Application No. 22167437.7, mailed Sep. 19, 2022, 7 pages.

* cited by examiner

*Primary Examiner* — Bryan A Evans
(74) *Attorney, Agent, or Firm* — Withrow & Terranova, PLLC

(57) ABSTRACT

A lifting step assembly for helping a user entering a cabin of an industrial vehicle, the lifting step assembly comprising a first step member configured for selectively moving along a first translation direction between a first position and a second position, so that the user can be lifted from the first position to the second position, a second step member configured for being moved between a retracted position and a deployed position wherein the second step member projects out of the first step member, and a deployment mechanism configured for moving the second step member from the retracted position to the deployed position when the distance between the first step member and the second position becomes lower than a predetermined threshold.

14 Claims, 11 Drawing Sheets ial Vehicle

LIFTING STEP ASSEMBLY FOR AN INDUSTRIAL VEHICLE

RELATED APPLICATIONS

The present application claims priority to European Patent Application No. 22167437.7, filed on Apr. 8, 2022, and entitled "LIFTING STEP ASSEMBLY FOR AN INDUSTRIAL VEHICLE," which is incorporated herein by reference in its entirety.

TECHNICAL FIELD

This disclosure relates to a lifting step assembly for equipping an industrial vehicle, like for example a long-haul truck.

BACKGROUND ART

Industrial vehicles such as trucks are equipped with boarding steps to help the truck driver, or the passengers, to get into the cabin. Some trucks are equipped with fixed steps that are arranged on the side of the cabin, like the rungs of a ladder. The steps are disposed longitudinally between the front bumper and the front wheel. Such steps may not be convenient to use, because the spacing between the ground and the first step, or between two successive steps, may be too large, especially for a short person. The ingress and egress from the cabin may thus be uncomfortable and potentially hazardous. For this reason, it is known to equip some trucks with a lifting step assembly. In this case, the user can stand on a motorized mobile step that can move vertically between two positions. The user may stand on the mobile step and activate an upward movement of the mobile step for entering the cabin. Similarly, when the user intends to leave the cabin, he may stand on the mobile step and activate a downward movement of this mobile step. The ingress and egress of the cabin is thus made easier. Nevertheless, ingress and egress may still be impractical, because the position of the mobile step is often too far forward from the seat along the longitudinal axis of the truck.

There is therefore a need to provide solutions that improve the practicality and ease of use of lifting step assemblies.

SUMMARY

To achieve this goal, it is proposed a lifting step assembly for helping a user entering a cabin of an industrial vehicle, the lifting step assembly comprising:
  a first step member on which the user can stand, the first step member being configured for selectively moving along a first translation direction between a first position (also referred to herein as a lower position) and a second position (also referred to herein as an upper position), so that the user can be lifted from the first position to the second position,
  a second step member configured for being moved between a retracted position and a deployed position in which the second step member projects out of the first step member in a direction transverse to the first translation direction of the first step member, so that the user can stand on the second step member when the second step member is in the deployed position,
  a deployment mechanism configured for moving the second step member from the retracted position to the deployed position in response to the distance between the first step member and the second position becoming lower than a predetermined threshold.

When the first step member comes close to its upper position, the second step member is deployed so that the user can move laterally away from the hinge axis of the door of the cabin. In such position of the lifting step assembly, the user may directly face the door sill of the cabin without being hampered by the opened cabin door. Access to be cabin is made easier. Consequently, the access is also safer, as the risk of falling to the ground is reduced, particularly when the user wants to egress the vehicle.

The following features, can be optionally implemented, separately or in combination one with the others:

According to an aspect of the lifting step assembly, the second step member is concealed under the first step member when the second step member is in the retracted position.

According to another aspect of the lifting step assembly, the deployment mechanism is configured for moving the second step member from the deployed position to the retracted position while the distance between the first step member and the second position is lower than a predetermined threshold, in response to a lowering command of the lifting step assembly.

The predetermined threshold is comprised between 1 centimeter and 3 centimeters.

The first step member is configured for selectively moving in a first translation direction between a first position and a second position in response to a lifting command of the lifting step assembly.

The first step member is configured for selectively moving in the first translation direction between the second position and the first position in response to a lowering command of the lifting step assembly.

According to an embodiment, the lifting step assembly comprises:
  an electric motor rigidly linked to the first step member, the electric motor comprising a first driving pinion,
  a rack configured for being fixed to a structural element of the industrial vehicle, the first driving pinion being engaged with the rack so that the first step member moves from the first position to the second position in a first rotation direction of the electric motor, and the first step member moves from the second position to the first position in a second rotation direction of the electric motor opposite to the first rotation direction.

According to an embodiment of the lifting step assembly:
  the deployment mechanism comprises an input member and an output member that can be mechanically connected and disconnected from the input member by a clutch mechanism,
  the electric motor comprises a second driving pinion engaging with the input member of the deployment mechanism, and
  the second step member is mechanically linked to the output member.

The same electric motor is used for the lifting operation and for the deployment of the second step member. The number of additional components required for the deployment mechanism is limited.

The first driving pinion and the second driving pinion are disposed on the same shaft of the electric motor.

The second driving pinion is a worm screw.

The worm screw is disposed at an axial end of the electric motor shaft.

The first driving pinion is axially located between the rotor of the electric motor and the worm screw.

The clutch mechanism is an interference clutch.

In an embodiment of the lifting step assembly, the clutch mechanism has a coupled position in which the input member and the output member are pivotally coupled in rotation and a uncoupled position in which the input member and the output member are free to rotate relatively to each other, and
the lifting step assembly comprises an abutment element configured for switching the clutch mechanism from the uncoupled position to the coupled position in response to the distance between the first step member and the second position becoming lower than a predetermined threshold.

The clutch mechanism is automatically switched from the uncoupled position to the coupled position when the first step member comes close to the upper position.

The abutment element is fixed relatively to the rack.

According to an aspect of the lifting step assembly, the clutch mechanism comprises a transmitting member configured to be moved between an uncoupled position in which the input member and the output member are free to rotate relatively to each other and a coupled position in which the input member and the output member are coupled in rotation, and the transmitting member is configured for sliding axially from the uncoupled position to the coupled position in response to an axial force exerted by the abutment element on the transmitting member.

The clutch mechanism is switched from the uncoupled position to the coupled position by mechanical interference with the abutment element. No extra sensor or extra electrical actuator is required to operate the clutch mechanism.

The axial force is parallel to the first translation direction of the first step member.

In an embodiment of the lifting step assembly, the transmitting member is configured for sliding axially from the coupled position to the uncoupled position under the action of an elastic element.

No electric device is required for switching the clutch mechanism from the coupled position to the uncoupled position.

The elastic element can be a return spring, for example a helical spring.

In an embodiment, the transmitting member comprises a male element configured for engaging into a female element of the input member.

In another embodiment of the lifting step assembly, the input member comprises a male element configured for engaging into a female element of the transmitting member.

In an example of implementation, the clutch mechanism may be a dog clutch.

According to an embodiment of the lifting step assembly, the input member comprises:
  an input wheel engaging with the second driving pinion of the electric motor,
  a reception chamber rigidly linked with the input wheel and coaxial with the rotation axis of the input wheel, the reception chamber being configured to receive a portion of the transmitting member when the clutch mechanism is in the coupled position,
and the reception chamber comprises a cylindrical section and a plurality of wall sections, each wall section extending radially from an outer periphery of the reception chamber towards the axis of the reception chamber.

In an embodiment of the lifting step assembly, the transmitting member comprises a shaft and a pinion engaging an output wheel of the output member, the shaft being configured for sliding axially in response to an axial force.

The pinion of the transmitting member may be permanently engaged with the output wheel of the output member.

In an embodiment, the transmitting member comprises:
  a cylindrical member coaxial with the shaft, the cylindrical member comprising an open channel extending in a radial direction of the cylindrical member,
  a coupling pin configured for sliding in the open channel under the action of an elastic spring, the elastic spring being configured to push the coupling pin out of the open channel.

The open channel of the cylindrical member is linear.

The open channel is a through hole.

The coupling pin may be cylindrical. In a variant, the coupling pin may be spheroidal.

The transmitting member may comprise two coupling pins configured for sliding in the open channel.

The two coupling pins are mounted at opposite ends of the open channel with an elastic spring inserted between the two coupling pins and acting simultaneously on both coupling pins.

In an embodiment, the cylindrical member of the transmitting member is configured to be engaged into the reception chamber of the input member in response to an axial force applied on the transmitting member, and in which the coupling pin comes in abutment against a wall section of the reception chamber so that the transmitting member and the input member are coupled in rotation.

The cylindrical member of the transmitting member has a width, measured along the axis of the shaft, larger than the height of the reception chamber, measured along the axis of the reception chamber.

In an embodiment of the lifting step assembly, the second step member is configured for moving along a second translation direction.

The output member may comprise a slide crank mechanism.

The slide crank mechanism provides a compact and robust arrangement able to deploy and retract the second step member.

In this embodiment, the output member comprises:
  an output wheel pivotally linked to the first member around a rotation axis, the output wheel comprising a first pivot pin extending parallel to the rotation axis of the output wheel and offset from the rotation axis of the output wheel,
  a second pivot pin fixed to the second step member,
  a linkage bar linking the first pivot pin and the second pivot pin.

The input wheel and the output wheel have parallel rotation axis.

The output wheel and the input wheel extend in parallel planes.

The output wheel and the input wheel are axially offset along a direction parallel to the rotation axis.

A displacement of the second step member from the retracted position to the deployed position or from the deployed position to the retracted position corresponds to an angular rotation of the output wheel comprised between 5° and 90°.

According to an embodiment of the lifting step assembly, the second step member is configured for sliding relatively to the first step member.

The first step member comprises a reception housing of the second step member.

The reception housing has grooves in which the second step member can slide.

The first step member may be rectangular.

For example, the length of the first step member is comprised between 15 centimeters and centimeters.

The second step member may be rectangular.

For example, the width of the first step member is comprised between 10 centimeters and centimeters.

The first step member may completely overlap the second step member when the second step member is in the retracted position.

The second step member partially overhangs the first step member when the second step member is in the deployed position.

The first step member partially overlaps the second step member when the second step member is in the deployed position.

In an embodiment, the lifting step assembly comprises a guiding element configured for guiding the first step member along the first translation direction.

The guiding element prevents a movement of the first step member in a direction different from the first translation direction.

The guiding element comprises four guiding rails extending parallelly. Each guiding rail comprises a groove. The first step member comprises four support pins extending from a side of the first member. Each support pin is engaged in the groove of a guiding rail.

The disclosure also relates to a truck comprising a lifting step assembly as described before, in which the first translation direction of the first step member is a vertical axis.

In an embodiment, the second step member is configured for moving along a second translation direction parallel to a longitudinal axis of the vehicle.

The lifting step assembly comprises a first control button configured for generating a lifting command.

The lifting step assembly comprises a second control button configured for generating a lowering command.

The first control button and the second control button may be disposed on a handle located next the entry sill of the cabin.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, i.e., designated for example by first element or second element, or first parameter and second parameter, etc. The purpose of this indexing is to differentiate elements or parameters that are similar, but not identical. This indexing does not imply the priority of one element, or one parameter over another, and names can be interchanged. When it is mentioned that a subsystem comprises a given element, the presence of other elements in this subsystem is not excluded.

Figure 1:
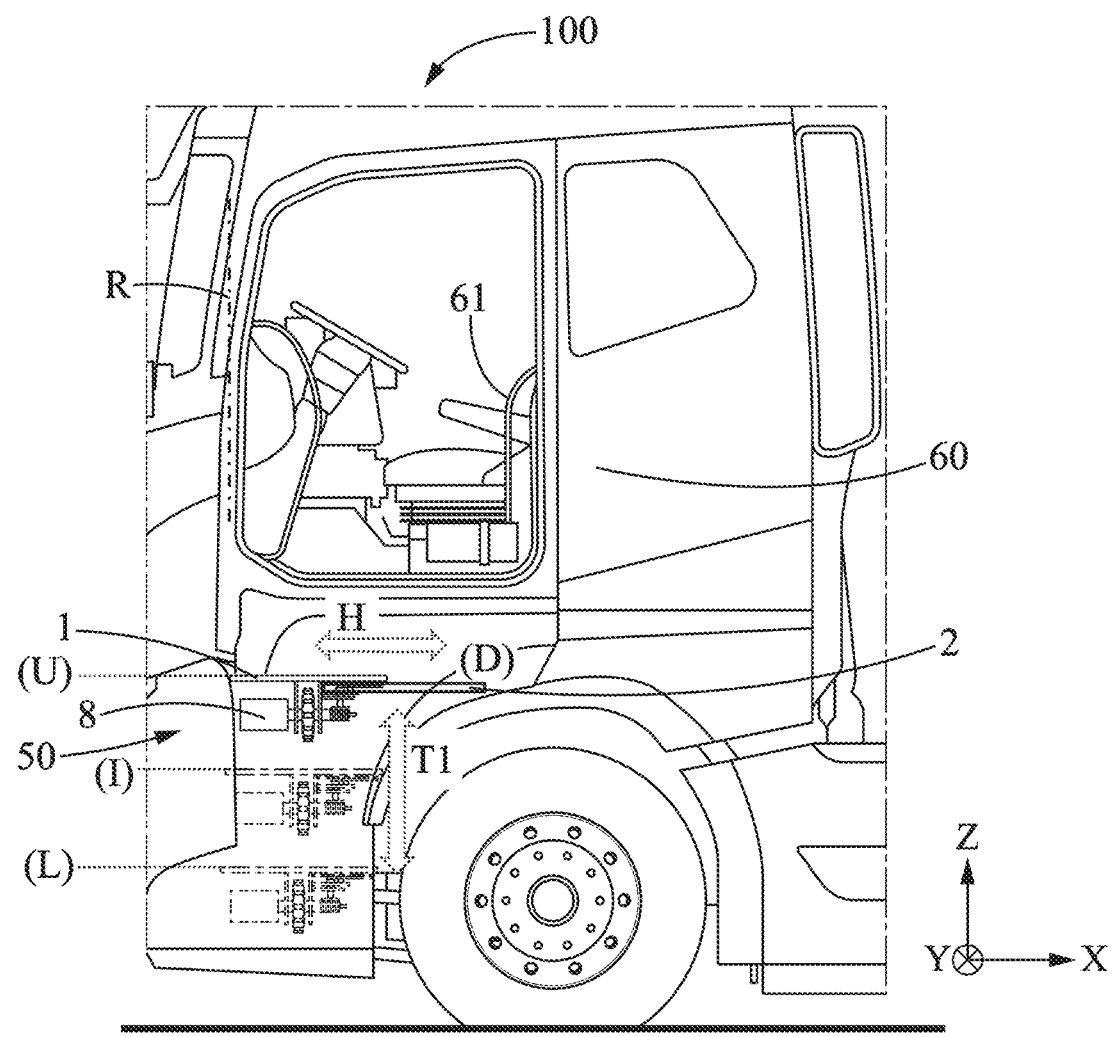
FIG. 1 is a schematic side view of an industrial vehicle equipped with an embodiment of a lifting step assembly.

FIG. 1 illustrates a truck 100 comprising a lifting step assembly 50 according to the invention. The lifting step assembly 50 comprises a mobile step member that can lift the user from a lower position L close to the ground up to an upper position U close to the level of the entry sill of the cabin 60 when he intends to enter the cabin of the truck. The lift step assembly 50 can also descend the user from the upper position U down to the lower position L when the user intends to egress the cabin 60 and leave the vehicle 100.

The lifting step assembly 50 for helping a user entering a cabin 60 of an industrial vehicle 100 comprises:

a first step member 1 on which the user can stand, the first step member 1 being configured for selectively moving along a first translation direction T1 between a first position L (also referred to herein as a lower position) and a second position U (also referred to herein as an upper position), so that the user can be lifted from the first position L to the second position U, a second step member 2 configured for being moved between a retracted position R and a deployed position D in which the second step member 2 projects out of the first step member 1 in a direction H transverse to the first translation direction T1 of the first step member 1, so that the user can stand on the second step member 2 when the second step member 2 is in the deployed position D, a deployment mechanism 3 configured for moving the second step member 2 from the retracted position R to the deployed position D in response to the distance between the first step member 1 and the second position U becoming lower than a predetermined threshold Th.

When the first step member 1 comes close to its upper position U, the second step member 2 is deployed so that the user can move laterally away from the hinge axis R of the door of the cabin 60. In such position of the lifting step assembly 50, the user may directly face the door sill of the cabin 60 without being hampered by the opened cabin door. Access to be cabin 60 is made easier. When the user wants to leave the truck, the same operation is performed in reversed direction. The ingress and egress of the cabin 60 is easier and safer. On FIG. 1, entry door is not represented to show the inside of the cabin 60.

The user can stand on the second step member 2 only when the second step member 2 is in the deployed position D. The user can stand on the first step member 1 when the second step member 2 is in the retracted position R and when the second step member 2 is in the deployed position D. For example, the user can have one foot on each step member 1, 2 when the second step member 2 is deployed.

The upper position U of the first step member 1 is the preferred position of the first step member 1 for ingress and egress of the user into and from the cabin 50. The deployed position D of the second step member 2 is the preferred position of the second step member 2 for ingress and egress of the cabin.

The first translation direction T1 of the first step member 1 is here a vertical axis Z. The first translation direction T1 may also be slanted compared to the vertical axis, and forms an angle lower than 5° with the vertical axis.

The second step member 2 is configured for moving along a second translation direction T2. The direction H along which the second step member 2 projects out of the first step member 1 may coincide with the longitudinal axis X of the truck 100. In other words, the second step member 2 is configured for moving along a second translation direction T2 parallel to a longitudinal axis X of the vehicle.

The lifting step assembly 50 comprises a first control button configured for generating a lifting command. The lifting step assembly 50 comprises a second control button configured for generating a lowering command. The first control button and the second control button may be disposed on a handle 61 located next the entry sill of the cabin 60. The control buttons have not been represented on the figures.

The first step member 1 is configured for selectively moving in a first translation direction T1 between a first position L and a second position U in response to a lifting command of the lifting step assembly 50. The first step member 1 is also configured for selectively moving in the first translation direction T1 between the second position U and the first position L in response to a lowering command of the lifting step assembly 50. Preferably, the upward movement of the lifting step assembly 50 is triggered by the user himself once he's steadily installed on the first step member 1. The downward movement is triggered in the same way. On FIG. 1, the lifting step assembly 50 is represented with dotted lines in a lower position L and in an intermediate position I that's located between the lower position L and the upper position U.

Figure 2:
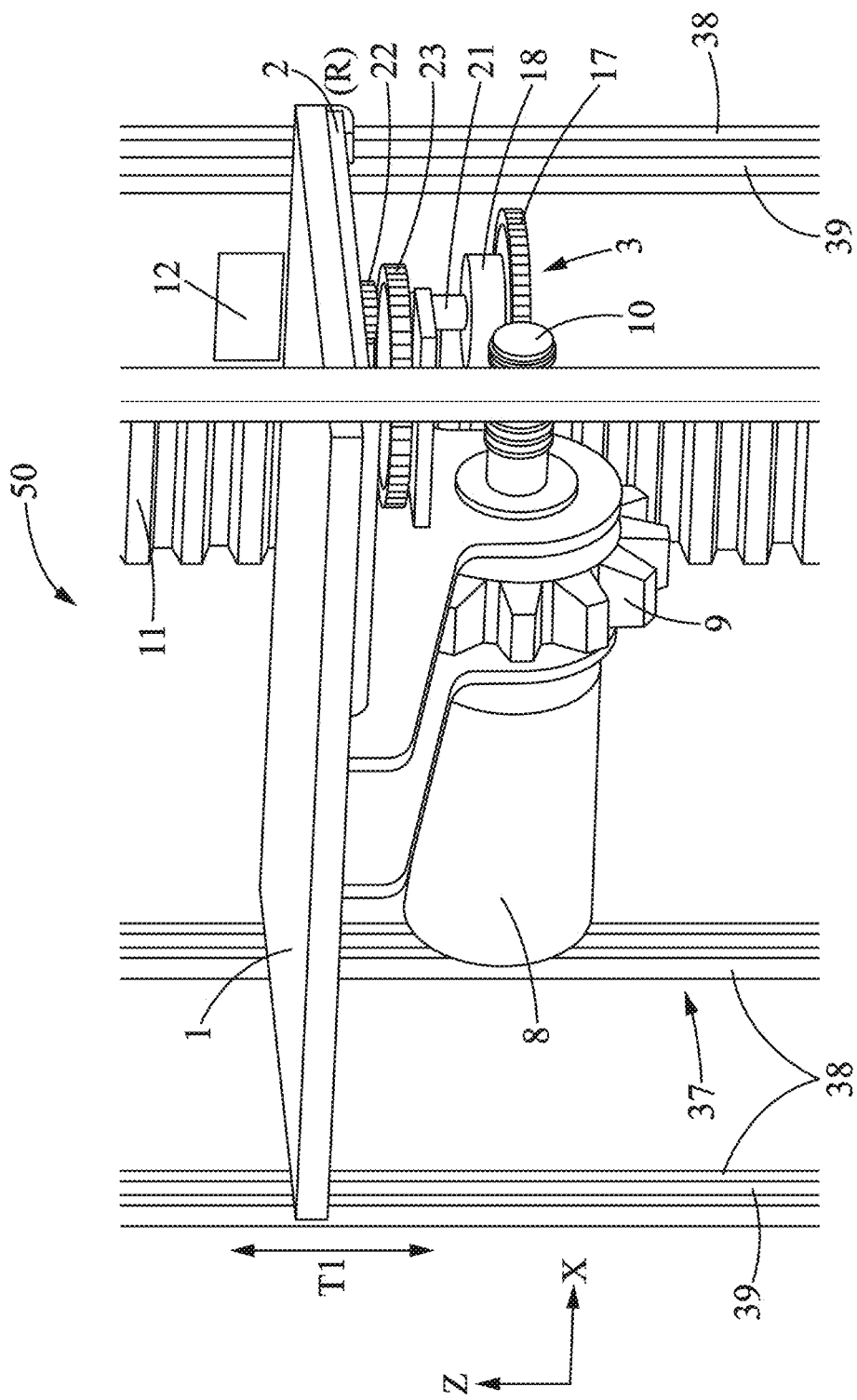
FIG. 2 is a first perspective view of the lifting step assembly of FIG. 1.
Figure 3:
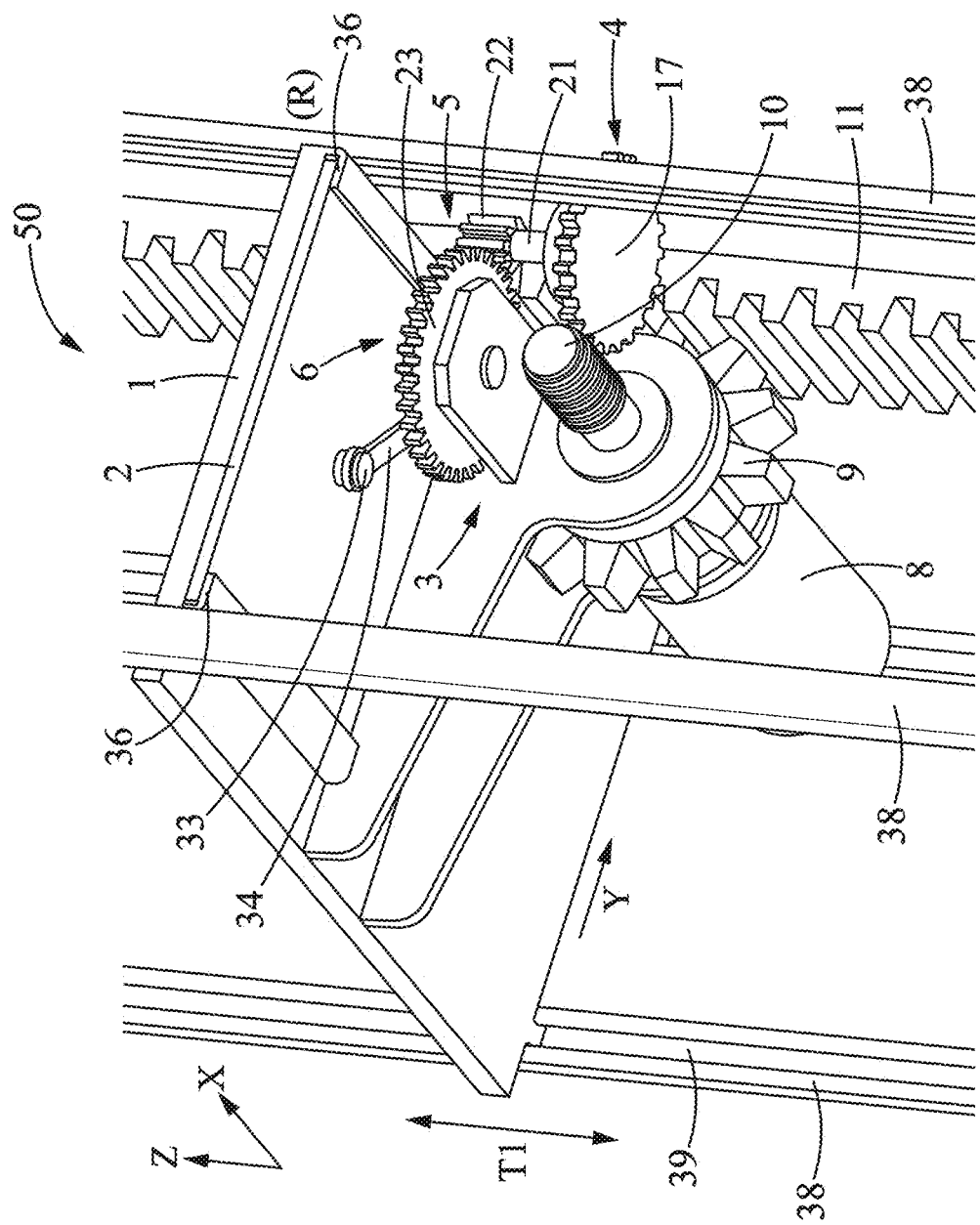
FIG. 3 is another perspective view of the lifting step assembly of FIG. 2, in a retracted position of the second step member.
Figure 4:
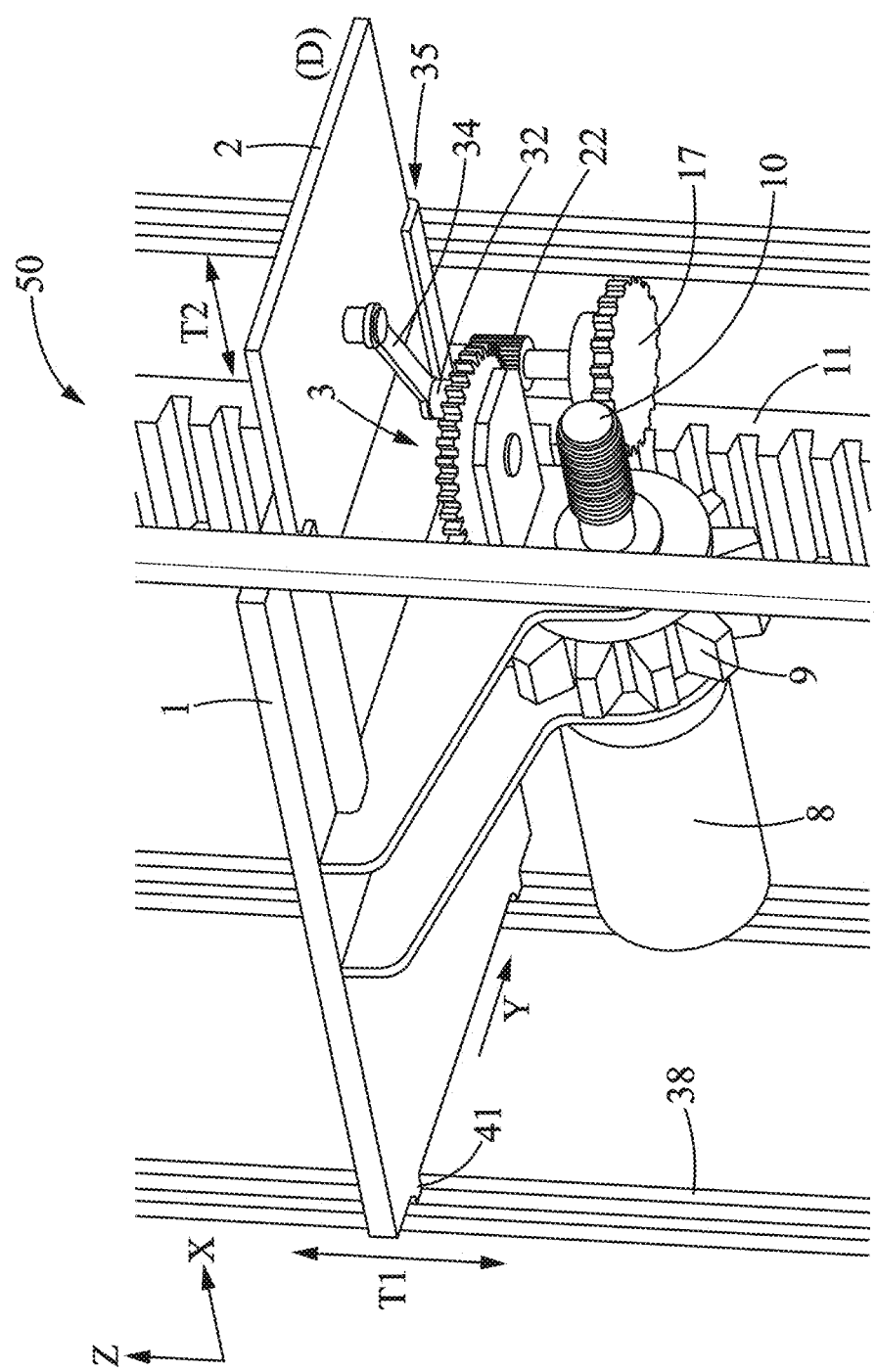
FIG. 4 is another perspective view of the lifting step assembly of FIG. 2, in a deployed position of the second step member.

As represented on FIGS. 2 to 4, the lifting step assembly 50 comprises a guiding element 37 configured for guiding the first step member 1 along the first translation direction T1. The guiding element 37 prevents a movement of the first step member 1 in a direction different from the first translation direction T1. The guiding element 37 comprises four guiding rails 38 extending parallelly. Each guiding rail 38 comprises a groove 39. The first step member 1 comprises four support pins 41 extending from a side of the first member 1. Each support pin 41 is engaged in the groove 39 of a guiding rail 38. The guiding rails 38 surround the first step member 1. The guiding rails 38 and support pins 41 are designed to provide a mechanical resistance adapted to the maximum weight to be lifted.

FIG. 2 and FIG. 3 represent the lifting step assembly 50 with the second step member 2 in the retracted position R. The second step member 2 is concealed under the first step member 1 when the second step member 2 is in the retracted position R.

The deployment mechanism 3 is configured for moving the second step member 2 from the deployed position D to the retracted position R while the distance between the first step member 1 and the second position U is lower than a predetermined threshold Th, in response to a lowering command of the lifting step assembly 50.

The predetermined threshold Th is comprised between 1 centimeter and 3 centimeters.

In other words, the second step member 2 starts deploying from the first step member 1 in the last few centimeters of an upward displacement stroke of the first step member 1. Similarly, the second step member 2 comes back into retracted position while the first step member is still within a few centimeters of the upper position U.

The deployment mechanism 3 is configured so that the second step member 2 is in deployed position D relatively to the first step member 1 only when the distance d between and the first step member 1 and the second position U is lower than the predetermined threshold Th.

As detailed for example on FIG. 2, the lifting step assembly 50 comprises:
  an electric motor 8 rigidly linked to the first step member 1, the electric motor 8 comprising a first driving pinion 9,
  a rack 11 configured for being fixed to a structural element of the industrial vehicle 100, the first driving pinion 9 being engaged with the rack 11 so that the first step member 1 moves from the first position L to the second position U in a first rotation direction of the electric motor 8, and the first step member 1 moves from the second position U to the first position L in a second rotation direction of the electric motor 8 opposite to the first rotation direction.

According to an embodiment of the lifting step assembly 50:
  the deployment mechanism 3 comprises an input member 4 and an output member 6 that can be mechanically connected and disconnected from the input member 4 by a clutch mechanism 7,
  the electric motor 8 comprises a second driving pinion 10 engaging with the input member 4 of the deployment mechanism 3, and
  the second step member 2 is mechanically linked to the output member 6.

The same electric motor 8 is used for the lifting operation and for the deployment of the second step member 2. The number of additional components required for the deployment mechanism is limited.

The first driving pinion 9 and the second driving pinion 10 are disposed on the same shaft of the electric motor 8.

The first driving pinion 9 has straight cut teeth.

The second driving pinion 10 is a worm screw. The worm screw 10 is disposed at an axial end of the electric motor shaft.

The first driving pinion 9 is axially located between the rotor of the electric motor 8 and the worm screw 10.

In the illustrated example, the clutch mechanism 7 is an interference clutch. In an example of implementation, the clutch mechanism 7 may be a dog clutch.

The clutch mechanism 7 has a coupled position C in which the input member 4 and the output member 6 are pivotally coupled in rotation and a uncoupled position F in which the input member 4 and the output member 6 are free to rotate relatively to each other, and the lifting step assembly 50 comprises an abutment element 12 configured for switching the clutch mechanism 7 from the uncoupled position F to the coupled position C in response to the distance between the first step member 1 and the second position U becoming lower than a predetermined threshold.

The clutch mechanism 7 is automatically switched from the uncoupled position F to the coupled position C when the first step member 1 comes close to the upper position U.

The abutment element 12 is fixed relatively to the rack 11.

The coupled position C is a position in which the input member 4 can transfer torque to the output member 6.

Torque transfer can happen in both rotation directions. The uncoupled position F is a position in which no torque transfer between input member 4 and output member 6 can take place, and they can rotate freely relatively to each other.

Figure 11:
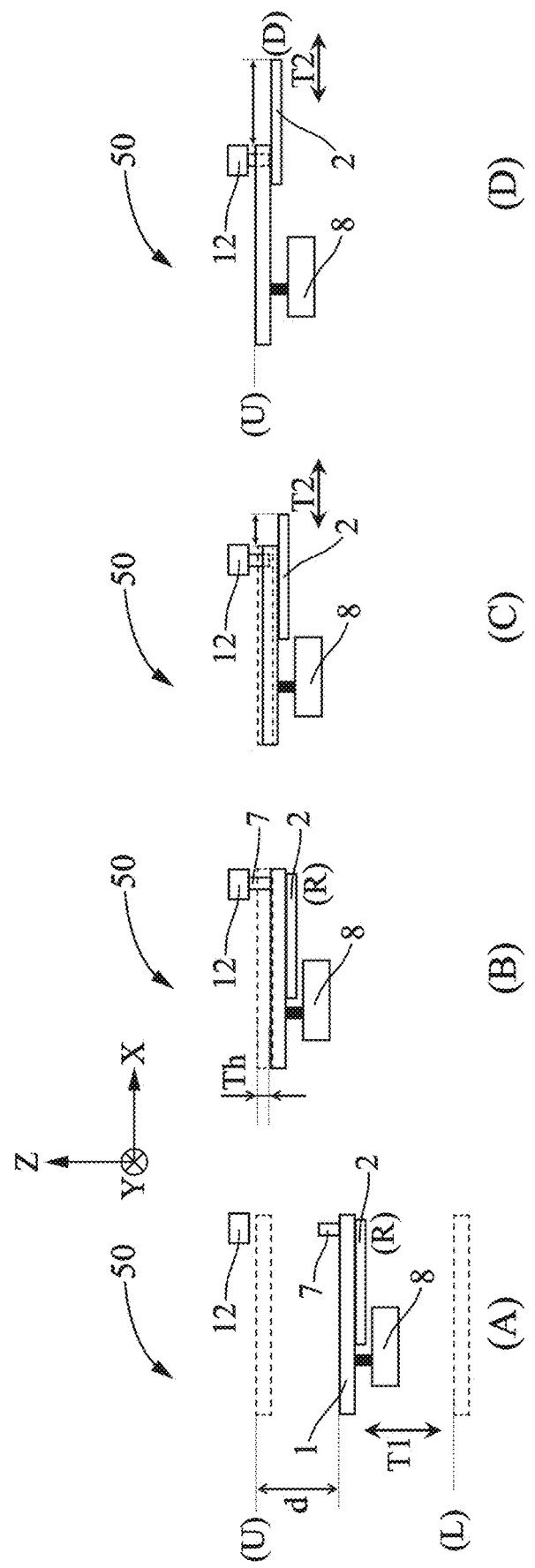
FIG. 11 is a side view illustrating the operation of the lifting step assembly.

FIG. 11 illustrates the deployment operation of the second step member 2 relatively to the step member 1. Sequence A to D illustrate the different positions, in chronological order, of the lifting step assembly 50 during an upward movement along T1 from the lower position L to the upper position U. The upper position U and the lower position L are represented with dashed lines. On part A of FIG. 11, the distance d between the first step member 1 and the second step member 2 is higher than the threshold Th. The second step member 2 is in the retracted position R. The clutch mechanism 7 is distant from the abutment element 12, and is in the uncoupled position. On part B, the distance between the first step member 1 and the second step member 2 is exactly equal to the threshold Th, and the clutch mechanism 7 comes into contact with the abutment element 12. The clutch mechanism 7 is in the uncoupled position and the second step member is still in the retracted position R. The clutch mechanism 7 is still in the same position as on part A, since it has just come into contact with the abutment element 12. On part C, the first step member 1 has continued his upwards progression, and the clutch mechanism 7 has been pushed by the abutment element 12. The clutch mechanism 7 is now in the coupled position and the second step member 2 is deploying along the translation direction T2. The second step member 2 is in an intermediate position between the retracted position R and the deployed position D. On part D, the first step member 1 has reached the upper position U, and the second step member 2 is now fully deployed and ready to be used.

The clutch mechanism 7 comprises a transmitting member 5 configured to be moved between an uncoupled position F in which the input member 4 and the output member 6 are free to rotate relatively to each other and a coupled position C in which the input member 4 and the output member 6 are coupled in rotation, and the transmitting member 5 is configured for sliding axially from the uncoupled position F to the coupled position C in response to an axial force exerted by the abutment element 12 on the transmitting member 5. The axial force is parallel to the first translation direction T1 of the first step member 1.

The clutch mechanism 7 is switched from the uncoupled position F to the coupled position C by mechanical interference with the abutment element 12. No extra sensor or extra electrical actuator is required to operate the clutch mechanism.

Figure 5:
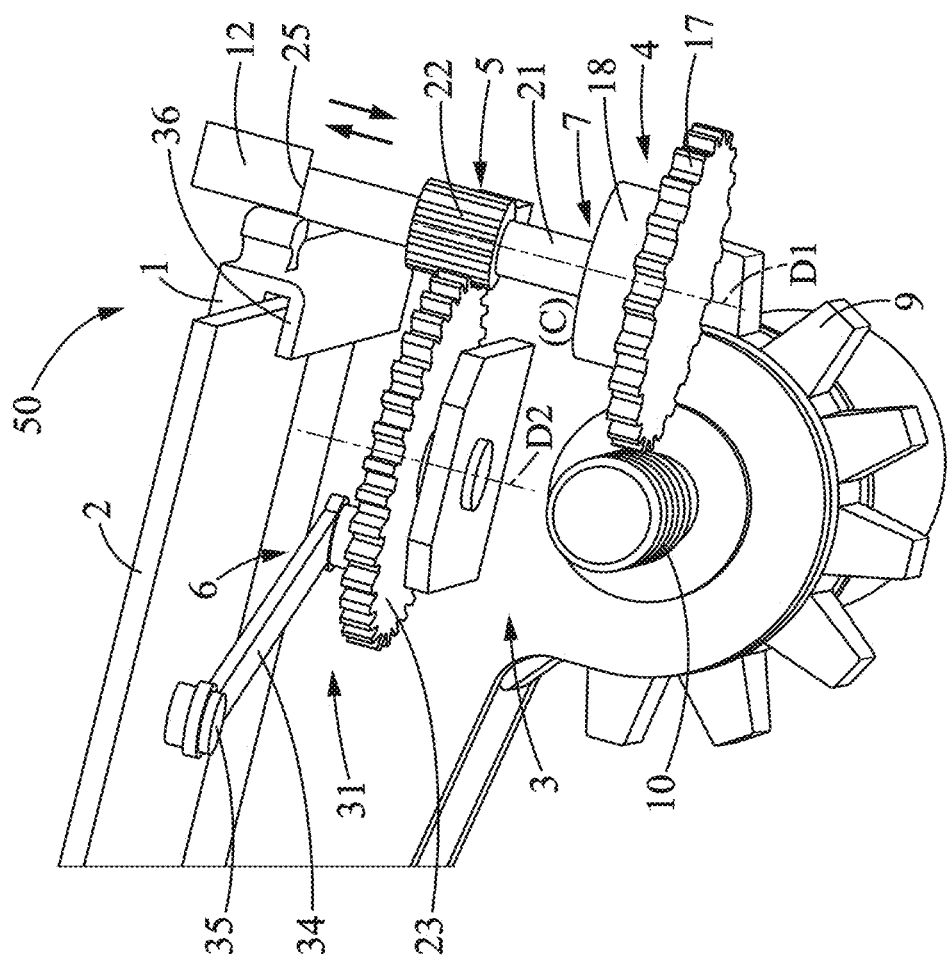
FIG. 5 is another detailed view of the lifting step assembly of FIG. 2, in a deployed position of the second step member.

As illustrated on FIG. 5, when the first step member 1 comes close to its upper position U, the transmitting member 5 comes in contact with the abutment element 12. Further movement of the first member 1 towards the upper position U causes the transmitting member 5 to be pushed by the abutment element 12. The transmitting member 5 thus slides axially and engages with the input member 4. On FIG. 5, the transmitting member 5 is fully engaged with the input member 4. This is also the case on FIG. 7 and part A of FIG. 8.

The transmitting member 5 is configured for sliding axially from the coupled position C to the uncoupled position F under the action of an elastic element 14. No electric device is required for switching the clutch mechanism 7 from the coupled position C to the uncoupled position U.

The transmitting member 5 is biased in the uncoupled position F by an elastic element 14. The elastic element 14 can be a return spring, for example a helical spring. The elastic element can be designed to work in compression, or in tension. On FIG. 6, there is mechanical clearance between an axial end 25 of the transmitting member 5 and the abutment element 12 (not represented). This mechanical clearance is also represented on part B of FIG. 8, in which axial end 25 of shaft 21 is distant from abutment element 12. Therefore, the transmitting member 5 is left in a position corresponding to the uncoupled position F of the clutch mechanism 7. As illustrated on part A of FIG. 8, the elastic element 14 is compressed between the lower face of the pinion 22 and a fixed bracket 24 when the transmitting member 5 is in a position corresponding to the coupled position C of the clutch mechanism 7. The axial end 25 of the shaft 21 of the transmitting member 5 has been pushed by the abutment element 12. The translational movement of the shaft 21 relatively to the first step member 1 results in an increased compression of the elastic element 14. As illustrated on part B of FIG. 8, when the first member 1 has moved downwards and the axial end 25 of the shaft 21 is not in contact any more with the abutment element 12, the elastic element 14 pushes the transmitting member 5 upwards, which disengages the clutch mechanism 7. On part B of FIG. 8, the clutch mechanism 7 is in the uncoupled position F. For clarity of the drawings, the bracket 24 and the return spring 14 have not been represented on FIGS. 2 to 7.

Once the user has safely accessed the cabin 60, the first step member 1 may be returned to the lower position L. During the initial phase of the first step member 1 downwards stroke, the second step member 2 is restored to the retracted position R. Once the first step member 1 has moved away a sufficient distance from the upper position U, i.e., a distance larger than the predetermined threshold Th, the transmitting member 5 is not in contact any more with the abutment element 12 and the elastic element 14 brings back the transmitting element 5 in the uncoupled position F.

In the illustrated embodiment, the transmitting member 5 comprises a male element configured for engaging into a female element of the input member 4. In another embodiment of the lifting step assembly 50, not represented, the input member 4 comprises a male element configured for engaging into a female element of the transmitting member 5.

Figure 6:
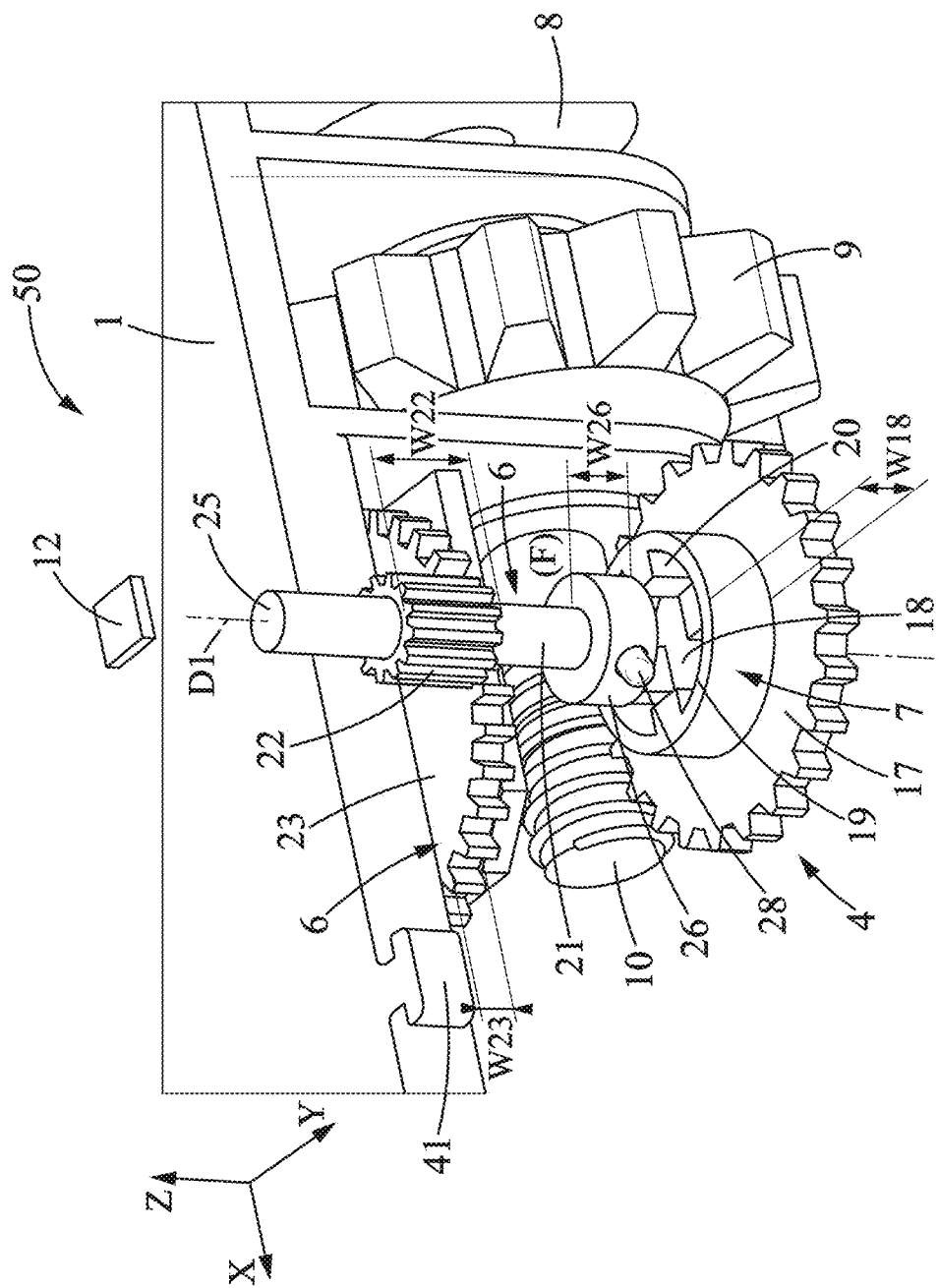
FIG. 6 is a perspective view of a lifting step assembly, with an embodiment of a clutch mechanism, the clutch mechanism being in a uncoupled position.
Figure 7:
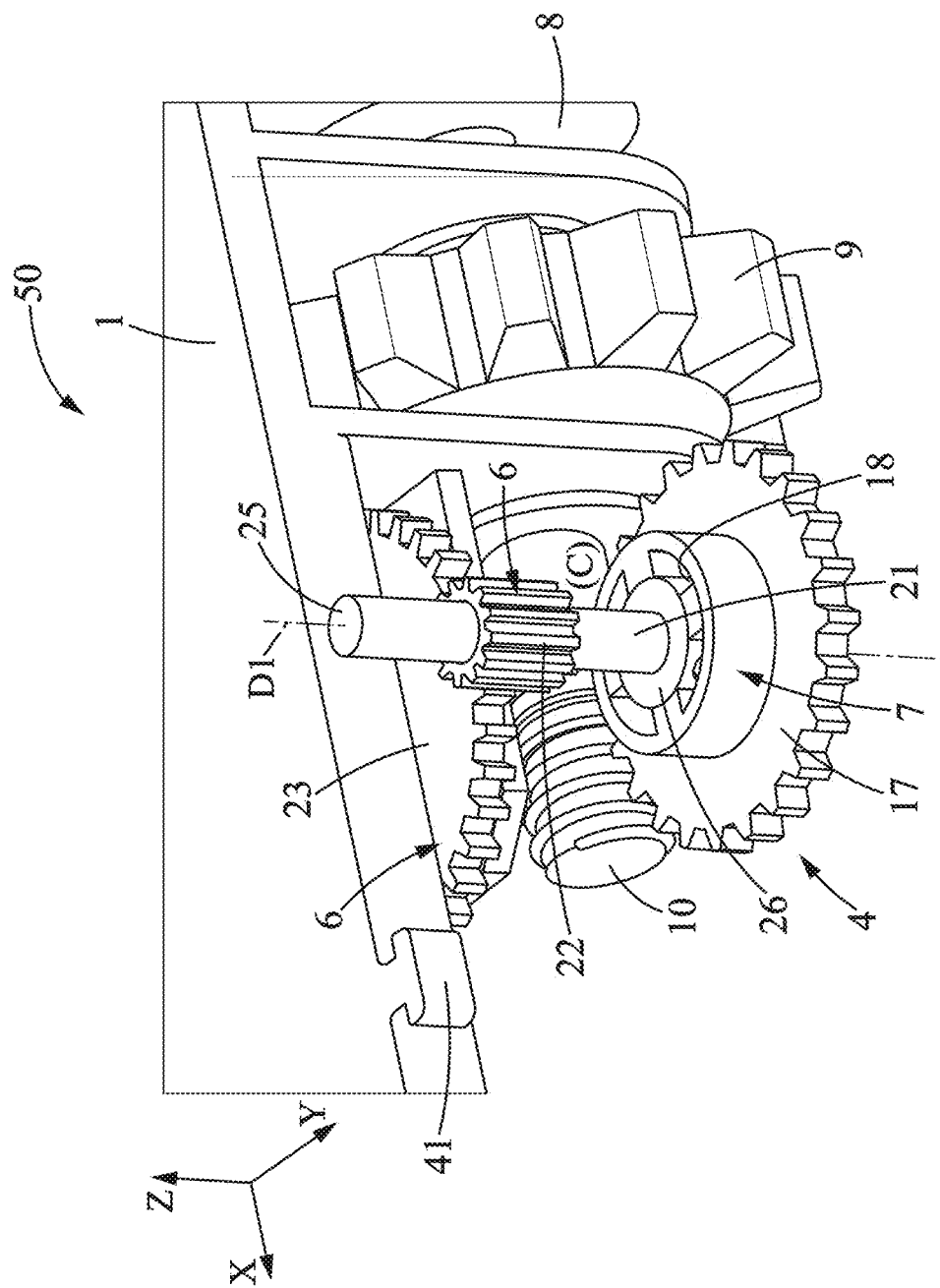
FIG. 7 is a perspective view of a the lifting step assembly of FIG. 6, with the clutch mechanism in a coupled position.
Figure 8:
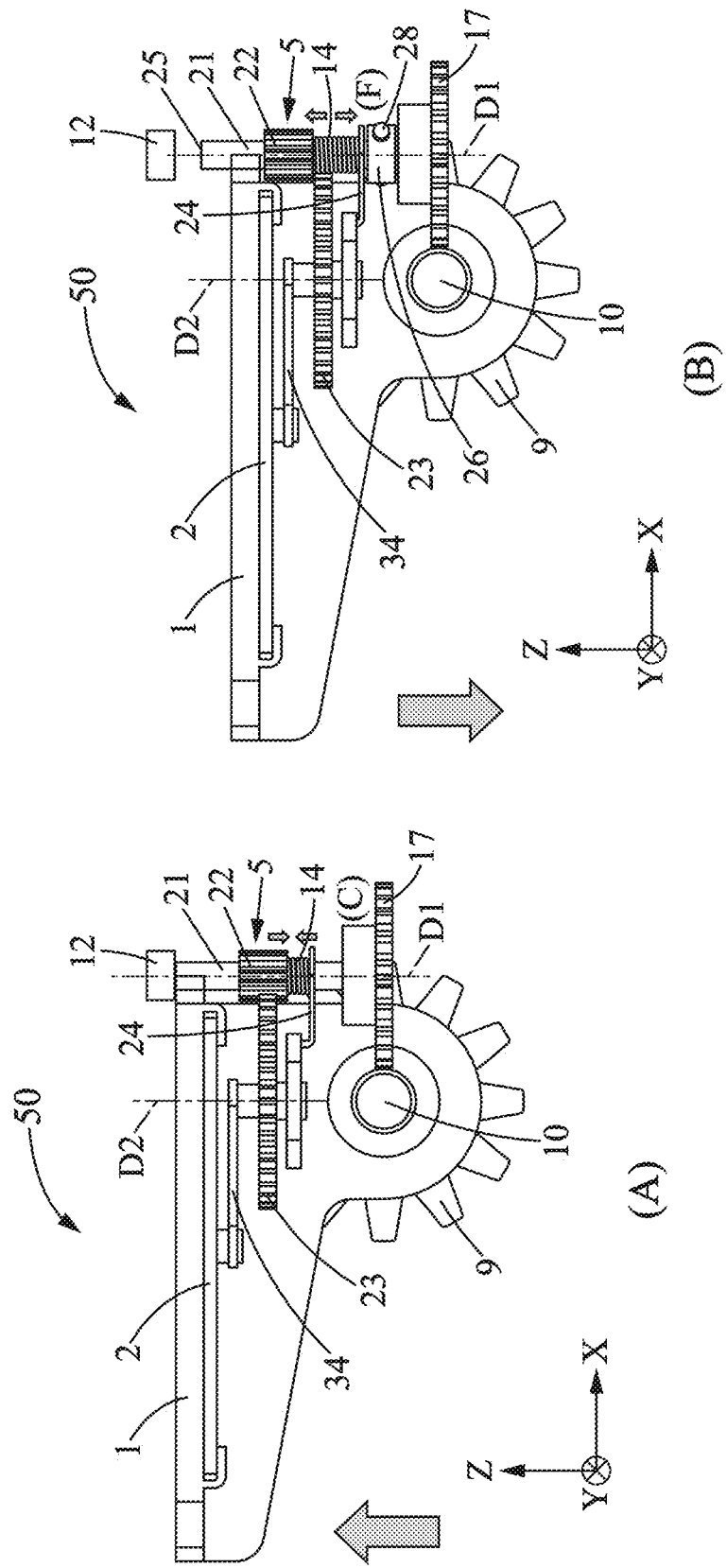
FIG. 8 is a side view of a lifting step assembly, with the clutch mechanism in a coupled position and in an uncoupled position.

As illustrated more precisely on FIGS. 5, 6 and 7, the input member 4 comprises:
- an input wheel 17 engaging with the second driving pinion 10 of the electric motor 8,
- a reception chamber 18 rigidly linked with the input wheel 17 and coaxial with the rotation axis D1 of the input wheel 17, the reception chamber 18 being configured to receive a portion of the transmitting member 5 when the clutch mechanism 7 is in the coupled position C. The reception chamber 18 comprises a cylindrical section 19 and a plurality of wall sections 20, each wall section extending radially from an outer periphery of the reception chamber 18 towards the axis of the reception chamber 18.

The transmitting member 5 comprises a shaft 21 and a pinion 22 engaging an output wheel 23 of the output member 6, the shaft 21 being configured for sliding axially in response to an axial force. The pinion 22 of the transmitting member 5 is here permanently engaged with the output wheel 23 of the output member 6.

For this, the pinion 22 of the transmitting member 5 has a width W22, measured along the axis of the shaft 21, larger than the width W23 of the teeth of the output wheel 23. Therefore, the pinion 22 of the transmitting member 5 and the teeth of the output wheel 23 can remain engaged together when the transmitting member 5 is axially moved and the relative position of the pinion 21 and the output wheel 22 is modified.

The input wheel 17 and the output wheel 23 have parallel rotation axis. The output wheel 23 and the input wheel 17 extend in parallel planes. The output wheel 23 and the input wheel 17 are axially offset along a direction parallel to the rotation axis.

An axial end 25 of the transmitting member 5 is configured for coming into contact with the abutment element 12 when the distance between the first step member 1 and the second position U becomes lower than the predetermined threshold Th. Once the transmitting member 5 is in contact with the abutment element 12, further displacement of the first member 1 causes the transmitting element 5 to be pushed axially by the abutment element 12 and to engage into the input member 4.

Figure 9:
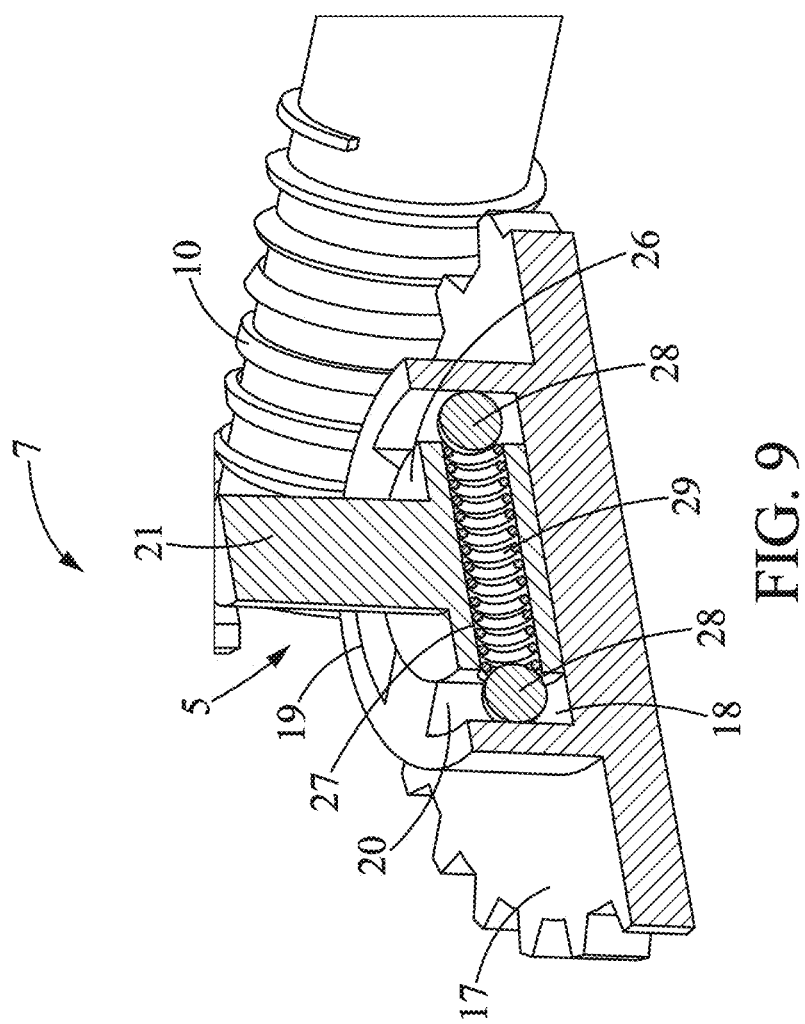
FIG. 9 is a perspective detailed view of a clutch mechanism of a lifting step assembly, in a uncoupled position.

As detailed on FIG. 9, the transmitting member 5 comprises:
- a cylindrical member 26 coaxial with the shaft 21, the cylindrical member 26 comprising an open channel 27 extending in a radial direction of the cylindrical member 26,
- a coupling pin 28 configured for sliding in the open channel 27 under the action of an elastic spring 29, the elastic spring 29 being configured to push the coupling 28 pin out of the open channel 27.

The open channel 27 of the cylindrical member 26 is linear. The open channel 27 is a through hole. The axis of the open channel 27 is perpendicular to the axis of the cylindrical member 26.

The coupling pin 28 may be cylindrical. The coupling 28 pin 28 may be spheroidal.

As represented on FIG. 9, the transmitting member 5 comprises two coupling pins 28 configured for sliding in the open channel 27. The two coupling pins 28 are mounted at opposite ends of the open channel 27 with an elastic spring 29 inserted between the two coupling pins 28 and acting simultaneously on both coupling pins 28. One axial end of the elastic spring 29 is in contact with a first coupling pin 28 and the other axial end of the elastic spring 29 is in contact with the second coupling pin 28. The spring 29 is here a helical spring.

The cylindrical member 26 of the transmitting member 5 is configured to be engaged into the reception chamber 18 of the input member 4 in response to an axial force applied on the transmitting member 5, and the coupling pin 28 comes in abutment against a wall section 20 of the reception chamber 19 so that the transmitting member 5 and the input member 4 are coupled in rotation.

The coupled position C of the clutch mechanism 7 is obtained when the coupling pins 28 are in contact with the wall sections 20. The spring 29 prevents the coupling pins 28 to retract into the channel 27. In case of mechanical overload, i.e., in case the transmitted torque becomes higher than a defined limit, the axial forces against the coupling pins may become higher than the force of the spring 29, and the coupling pins are pushed back into the channel. In other words, the clutch mechanism is automatically deactivated in case of mechanical overload, and no damage is done to the electric motor nor to the different wheels and pinions.

The cylindrical member 26 of the transmitting member 5 has a width W26, measured along the axis of the shaft 21, larger than the height W18 of the reception chamber 18, measured along the axis of the reception chamber 18. Therefore, the rotation of the input member 4 and the transmitting member 5 can continue while the deployment of the second step member 2 is on-going from the rotation of the output member 6.

The output member 6 comprises here a slide crank mechanism 31.

The slide crank mechanism 31 provides a compact and robust arrangement able to deploy and retract the second step member 2. The slide crank mechanism 31 transforms a rotational motion of the output wheel 23 into a reciprocating motion of the second step member 2.

As detailed on FIGS. 2 to 4, the output member 6 comprises:
- an output wheel 23 pivotally linked to the first member 1 around a rotation axis D2, the output wheel 23 comprising a first pivot pin 32 extending parallel to the rotation axis D2 of the output wheel 23 and offset from the rotation axis of the output wheel 23,
- a second pivot pin 33 fixed to the second step member 2,
- a linkage bar 34 linking the first pivot pin 32 and the second pivot pin 33.

A displacement of the second step member 2 from the retracted position R to the deployed position D or from the deployed position D to the retracted position R corresponds to an angular rotation of the output wheel 23 comprised between 5° and 90°.

The second step member 2 is configured for sliding relatively to the first step member 1. The first step member 1 comprises a reception housing 35 of the second step member 2, illustrated for example on FIG. 2 and FIG. 3. The reception housing 35 has grooves 36 in which the second step member 2 can slide. The second step member 2 comprises a plate with two parallel edges. The parallel edges of the second member 2 are received in the grooves 36 of the reception housing of the first step member 1.

Figure 10:
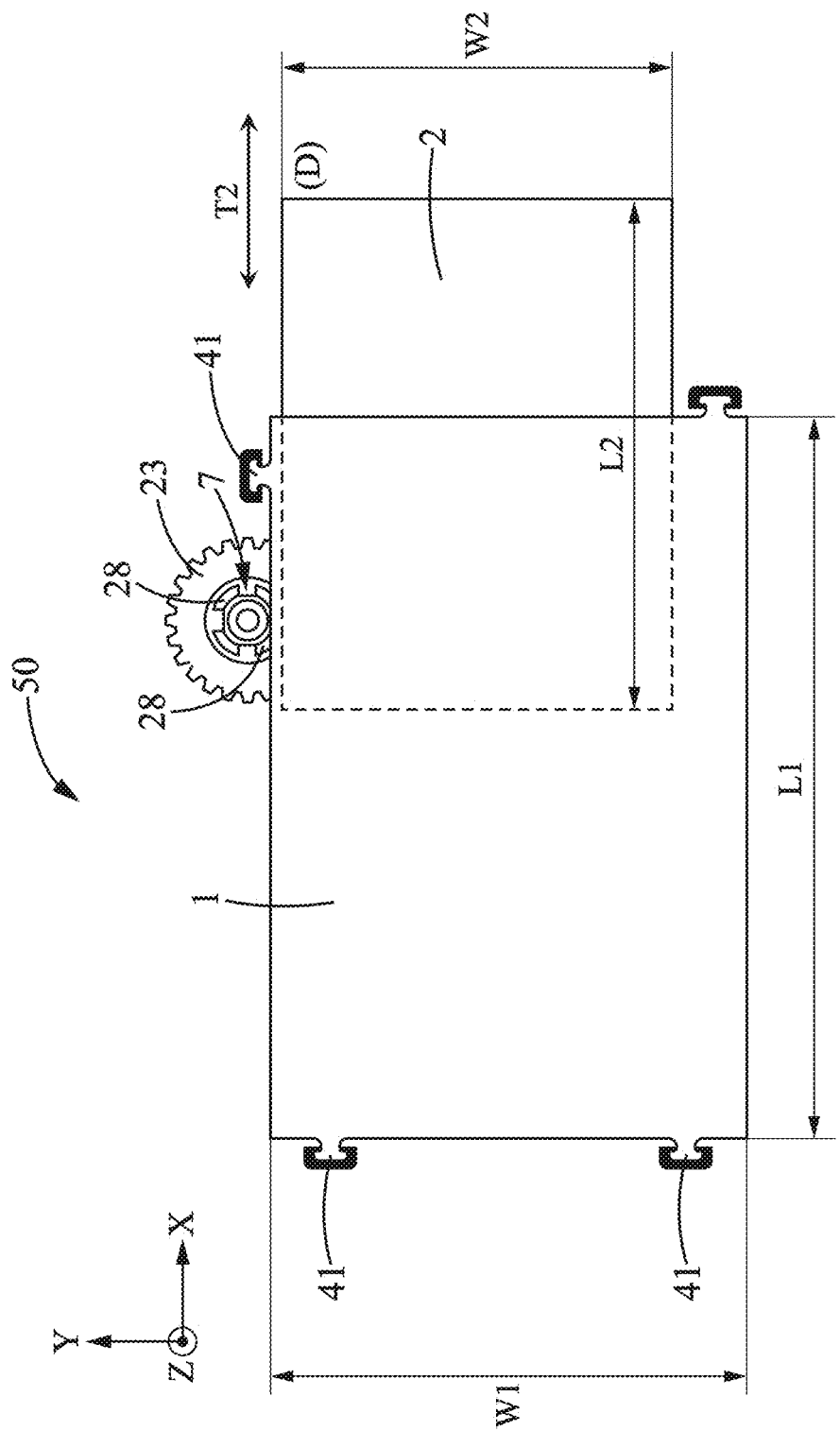
FIG. 10 is a top view of an embodiment of a lifting step assembly.

FIG. 10 represents a top view of the lifting step assembly 50. The first step member 1 is here rectangular. In the example, the length L1 of the first step member 1 is comprised between centimeters and 40 centimeters.

The second step member 2 is also rectangular. The width W1 of the first step member 1 is comprised between 10 centimeters and 30 centimeters.

The length L2 of the second step member 2 is comprised between 5 centimeters and 15 centimeters. The width W2 of the second step member 2 is comprised between 7 centimeters and centimeters.

When the lifting step assembly 50 is in its normal installation position, the second member 2 is under the first step member 1. The first step member 1 may completely overlap the second step member 2 when the second step member 2 is in the retracted position R. The first step member 1 partially overlaps the second step member 2 when the second step member 2 is in the deployed position D. The second step member 2 partially overhangs the first step member 1 when the second step member 2 is in the deployed position D.

The lifting step assembly described may be an original equipment of the truck, i.e., an equipment fitted at the factory when the truck is manufactured. The lifting step assembly may also be an aftermarket equipment. In that case, the fixed steps of the truck are dismantled, and the different components are installed. A first sub-assembly may comprise the first step member 1, the second step member 2, the electric motor 8 and the deployment mechanism 3. The guiding rails, rack, abutment element, control buttons and wiring loom complement the aftermarket kit.

The lifting step assembly may equip different types of trucks, like for example long haul trucks, construction trucks, mining trucks.

The invention claimed is:

1. A lifting step assembly for helping a user entering a cabin of an industrial vehicle, the lifting step assembly comprising:
a first step member on which the user can stand, the first step member being configured for selectively moving along a first translation direction between a first position and a second position, so that the user can be lifted from the first position to the second position;
a second step member configured for being moved between a retracted position and a deployed position wherein the second step member projects out of the first step member in a direction transverse to the first translation direction of the first step member, so that the user can stand on the second step member when the second step member is in the deployed position;
a deployment mechanism configured for moving the second step member from the retracted position to the deployed position in response to the distance between the first step member and the second position becoming lower than a predetermined threshold;
an electric motor rigidly linked to the first step member, the electric motor comprising a first driving pinion; and
a rack configured for being fixed to a structural element of the industrial vehicle;
wherein the first driving pinion is engaged with the rack so that the first step member moves from the first position to the second position in a first rotation direction of the electric motor, and the first step member moves from the second position to the first position in a second rotation direction of the electric motor opposite to the first rotation direction.

2. The lifting step assembly of claim 1, wherein:
the deployment mechanism comprises an input member and an output member that can be mechanically connected and disconnected from the input member by a clutch mechanism,
the electric motor comprises a second driving pinion engaging with the input member of the deployment mechanism, and
the second step member is mechanically linked to the output member.

3. The lifting step assembly of claim 2, wherein:
the clutch mechanism has a coupled position wherein the input member and the output member are pivotally coupled in rotation and an uncoupled position wherein the input member and the output member are free to rotate relatively to each other, and
the lifting step assembly further comprises an abutment element configured for switching the clutch mechanism from the uncoupled position to the coupled position in response to the distance between the first step member and the second position becoming lower than a predetermined threshold.

4. The lifting step assembly of claim 3, wherein:
the clutch mechanism further comprises a transmitting member configured to be moved between an uncoupled position wherein the input member and the output member are free to rotate relatively to each other and a coupled position wherein the input member and the output member are coupled in rotation, and
the transmitting member is configured for sliding axially from the uncoupled position to the coupled position in response to an axial force exerted by the abutment element on the transmitting member.

5. The lifting step assembly of claim 4, wherein the transmitting member is configured for sliding axially from the coupled position to the uncoupled position under the action of an elastic element.

6. The lifting step assembly of claim 4, wherein the transmitting member comprises a male element configured for engaging into a female element of the input member.

7. The lifting step assembly of claim 4, wherein the input member comprises:
an input wheel engaging with the second driving pinion of the electric motor, and
a reception chamber rigidly linked with the input wheel and coaxial with the rotation axis of the input wheel, the reception chamber being configured to receive a portion of the transmitting member when the clutch mechanism is in the coupled position,
wherein the reception chamber comprises a cylindrical section and a plurality of wall sections, each wall section extending radially from an outer periphery of the reception chamber towards the axis of the reception chamber.

8. The lifting step assembly of claim 4, wherein the transmitting member further comprises a shaft and a pinion engaging an output wheel of the output member, the shaft being configured for sliding axially in response to an axial force.

9. The lifting step assembly of claim 7, wherein the transmitting member further comprises:
a cylindrical member coaxial with the shaft, the cylindrical member comprising an open channel extending in a radial direction of the cylindrical member, and
a coupling pin configured for sliding in the open channel under the action of an elastic spring, the elastic spring being configured to push the coupling pin out of the open channel.

10. The lifting step assembly of claim 9, wherein the cylindrical member of the transmitting member is configured to be engaged into the reception chamber of the input member in response to an axial force applied on the transmitting member, and where in the coupling pin comes in abutment against a wall section of the reception chamber so that the transmitting member and the input member are coupled in rotation.

11. The lifting step assembly of claim 1, wherein the second step member is configured for moving along a second translation direction.

12. The lifting step assembly of claim 2, wherein the output member comprises a slide crank mechanism.

13. A truck comprising the lifting step assembly of claim 1, wherein the first translation direction of the first step member is a vertical axis.

14. The truck of claim 13, wherein the second step member is configured for moving along a second translation direction parallel to a longitudinal axis of the vehicle.

* * * * *